(12) United States Patent
Sapak et al.

(10) Patent No.: US 8,029,037 B2
(45) Date of Patent: Oct. 4, 2011

(54) METHOD AND APPARATUS FOR FORMING A VEHICLE TRIM PANEL

(75) Inventors: Ben Sapak, West Olive, MI (US); Todd D. Nellis, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 12/744,564

(22) PCT Filed: Nov. 26, 2008

(86) PCT No.: PCT/US2008/085020
§ 371 (c)(1),
(2), (4) Date: Jul. 13, 2010

(87) PCT Pub. No.: WO2009/070756
PCT Pub. Date: Jun. 4, 2009

(65) Prior Publication Data
US 2010/0295329 A1    Nov. 25, 2010

Related U.S. Application Data

(60) Provisional application No. 60/996,587, filed on Nov. 26, 2007.

(51) Int. Cl.
*B60R 13/02* (2006.01)
*B29C 43/02* (2006.01)
*B29C 43/40* (2006.01)

(52) U.S. Cl. ....... 296/1.08; 264/319; 264/325; 264/153; 425/408; 425/416

(58) Field of Classification Search .................. 293/128; 52/716.5, 716.6; 428/31; 296/1.08, 146.7, 296/214; 264/319, 325, 153; 425/408, 416
See application file for complete search history.

(56) References Cited

U.S. PATENT DOCUMENTS

| 5,106,149 A | 4/1992 | Glossop, Jr. et al. |
| 6,355,196 B1 | 3/2002 | Kotnis et al. |
| 2008/0037266 A1 | 2/2008 | Cunnien et al. |

FOREIGN PATENT DOCUMENTS

| DE | 199 09 472 A1 | 9/2000 |
| DE | 202 19 391 U1 | 4/2004 |
| DE | 20 2006 015900 U1 | 12/2006 |
| GB | 2 290 651 A | 1/1996 |
| WO | 00/09307 A2 | 2/2000 |

OTHER PUBLICATIONS

International Search Report for corresponding PCT, Application No. PCT/US2008/085020, dated Nov. 26, 2008, Published as WO 2009/070756 on Jun. 4, 2009.
Preliminary Report and Written Report for corresponding PCT Application No. PCT/US2008/085020, dated Nov. 26, 2008, Published as WO 2009/070756 on Jun. 4, 2009.

*Primary Examiner* — Lori Lyjak
(74) *Attorney, Agent, or Firm* — Dobrusin & Thennisch PC

(57) ABSTRACT

A trim panel for a vehicle is formed with a pinch-sealed edge by compression molding. The mold is designed with one or more cutting surfaces that compress or pinch the trim panel material to the point of severing the trim panel to form a tightly compressed and cut edge.

15 Claims, 9 Drawing Sheets

METHOD AND APPARATUS FOR FORMING A VEHICLE TRIM PANEL

CLAIM OF PRIORITY

This application is filed pursuant to 35 USC §371 based upon and claiming priority from PCT/US2008/085020 filed 26 Nov. 2008 and claims priority from United States Provisional application 60/996,587 files 26 Nov. 2007, both incorporated herein by reference.

This application claims priority to U.S. Provisional Application 60/996,587 filed Nov. 26, 2007, which is incorporated herein by reference in its entirety.

BACKGROUND

The following background is provided simply as an aid in understanding the disclosed device and is not admitted to describe or constitute prior art.

1. Field of the Invention

The present disclosure relates generally to methods and apparatus for forming motor vehicle trim panels such as, for example, garnishes, headliners, and door panels.

2. Related Art

Trim panels are used in occupant compartments of motor vehicles. For example, a vehicle body may include a quarter panel with an inner panel and an outer panel attached to one another and attached to a vehicle structure in some manner. The quarter panel may include a decorative trim panel mounted to the inner panel. The edges of trim panels are generally formed and/or cut in a manner that leaves all of their component parts visible, which provides an unattractive edge that is also susceptible to separating over time. Thus, various methods are employed to modify and strengthen the edge. Most methods involve adding a cover to the edge and/or folding the edge over and sealing it.

Headliners are interior trim panels that are coupled to the roof of the vehicle and may have openings to accommodate features such as a sunroof. Headliners are generally formed from a rigid substrate made of a material such as a polymer or a reinforced polymer composite material or a foam core made from an elastomer and binders or binding agents. They also often include a cover material such as a fabric. The headliner may be formed using a compression foaming process. Door panels are interior trim panels that are coupled to a vehicle door and may have openings for various components (e.g., door handle, window controls) or decorative elements (e.g., lights, design elements). Garnishes are interior trim panels that are couple to roof pillars or supports (e.g., between the front windshield and a side window). Other examples of interior trim panels include seating elements and instrument panels.

SUMMARY

Some edges (e.g., edges that will be visible in the fully assembled vehicle) of a trim panel (e.g., the outside edges, edges of openings in the trim panel, etc.) are finished to provide a clean and aesthetically pleasing appearance. These trim panel edges may be fitted with a secondary trim piece, folded over, or otherwise formed to provide a smooth edge. Most conventional trim panels include edges that are finished with a secondary process or during the molding process with a secondary action to form the edge. However, such methods add cost and/or time to the manufacturing process. Folded edges also increase the width of the finished edge, which increases the height of trim pieces stacked for shipment, decreasing the number of trim panel pieces that can be fit into a given amount of cargo space. Other trim panels and interior surfaces may be formed using similar processes with similar requirements for forming edges.

Therefore, it would be advantageous to provide a smooth trim panel edge during the molding process without an additional action in the mold.

When openings are formed in sections of a trim panel (e.g., an opening for a sunroof in a headliner) a plug or offal results. As the trim panel is removed from the tool, the offal may be left behind and have to removed by a second operation such as, for example, by some person or mechanism reaching into the tool to remove the offal. This adds time and cost, as well as risk of malfunction causing injury or other damage, to the process.

Therefore, it would be advantageous to provide a mechanism for safely removing a plug from a tool simultaneously with removing the trim panel.

This invention relates to a trim panel comprising a pinch-sealed edge wherein the pinch-sealed edge is formed in a compression mold.

This invention also relates to a method of manufacturing a trim panel, comprising forming the trim panel in a mold, compressing the trim panel in the mold, and forming a pinch-sealed edge by compressing a portion of the trim panel until it is severed to form an edge.

This invention also relates to a method forming an opening in a trim panel, comprising positioning the trim panel in a mold, and compressing the trim panel at an edge of the desired opening until the trim panel is cut.

This invention also relates to a mold, comprising a lower half with a first ridge, an upper half with a second ridge, where the first ridge is located on a first inclined surface and the second ridge is located on a second inclined surface and where the first ridge and the second ridge come into contact with each other when the mold is closed.

This invention also relates to a mold for forming a trim panel comprising a lower half, an upper half, a lower tool insert, an upper tool insert, and at least one ridge on an upper insert tool and/or a bottom insert tool.

These and other features and advantages of various embodiments of systems and methods according to this invention are described in, or are apparent from, the following detailed descriptions of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein.

DETAILED DESCRIPTION OF THE PREFERRED EMBODIMENTS

This invention relates to methods for forming trim panels for vehicle interiors and trim panels made by such processes. More particularly, it relates to methods for forming a clean, attractive edge on trim panels. For purposes of this disclosure, a trim panel is a covering usable to cover any interior surface or component. Such trim panels may be formed by compression molding. Trim panels include, but are not limited to, headliners, door panels, garnishes, instrument panels, seats, consoles, steering wheels, and/or components of such elements. Although the disclosed method is illustrated as applied to only a few types of trim panels, the methods may be adapted to the manufacture of any known or later-developed trim panel.

Figure 1:
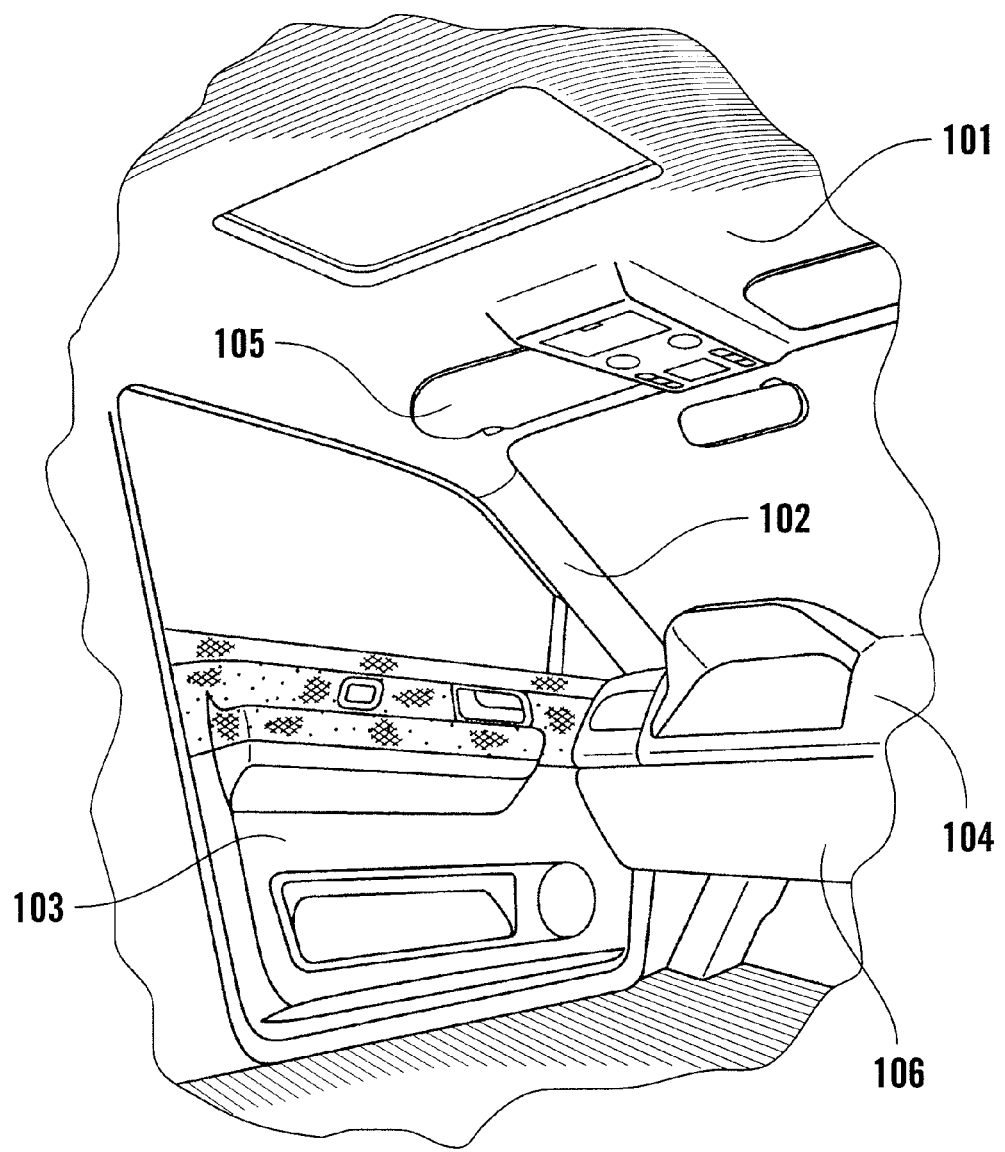
FIG. 1 is an isometric view of a vehicle interior showing various interior trim members.

FIG. 1 shows a vehicle interior with various interior trim pieces or panels including a headliner 101, a garnish 102, a door panel 103, seating components (not shown), a steering wheel (not shown), an instrument panel 104, a sun visor 105, and/or a floor panel 106. The trim panels preferably include rigid substrates formed, for example, from a polymer (e.g., polyurethane, polypropylene, etc.) or a natural fiber (e.g., wood), a composite such as a fiberglass-reinforced polymer, or any other material known in the art. A cover material such as a textile (e.g., a woven fabric, a knit fabric, etc.), leather, a polymer material (e.g., vinyl, thermoplastic polyurethane (TPU), thermoplastic olefin (TPO), polyvinyl chloride (PVC), etc.), or any other suitable cover material, preferably is adhered to the substrate. A compressible layer formed from a material such as a close-cell foam may be provided between the cover material and the substrate. As shown in FIG. 1, the headliner may include openings for features such as sunroofs. The outside edges and edges around such openings can be formed as set forth herein to provide a finished appearance.

Figure 2:
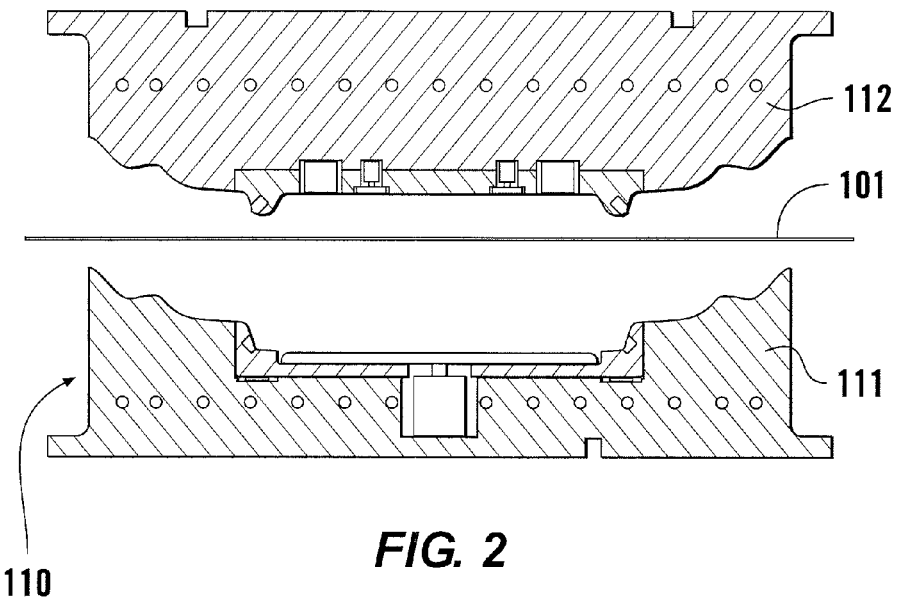
FIG. 2 is a cross-sectional view of an exemplary embodiment of an open mold for a trim panel and an unformed trim panel according to this invention.

FIGS. 2 to 7 illustrate various exemplary embodiments for how to form a sunroof opening within a trim panel 101. As shown in FIG. 2, unformed trim panel material 101 is fed into an open mold 110. The mold 110 has a lower piece 111 and an upper piece 112. The mold 110 is designed to both form the trim panel 101 and to pinch-seal cut and remove a sunroof opening with a clean attractive edge by pinching and cutting the headliner material placed in the mold 110. In various exemplary embodiments, the trim panel 101 is heated prior to entering an unheated mold 110.

Figure 3:
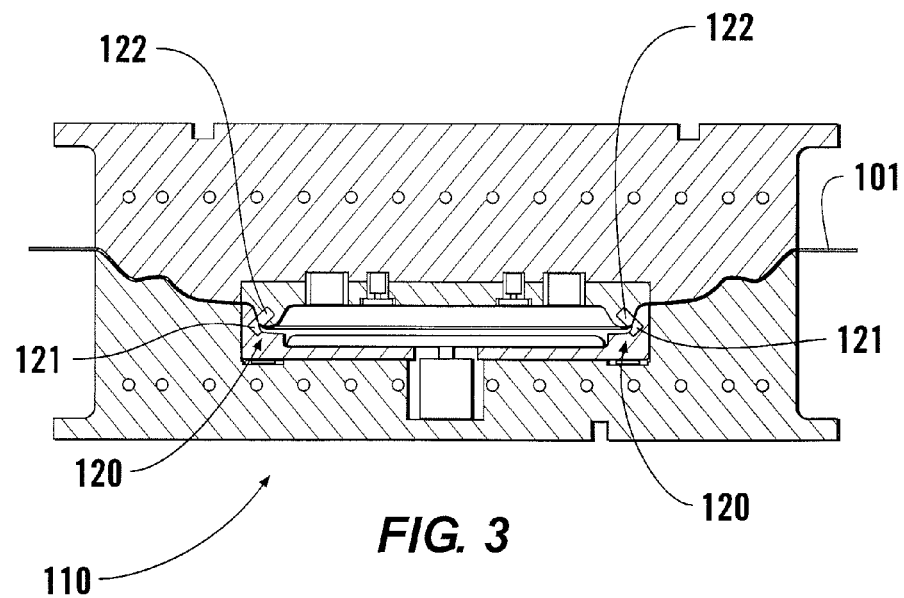
FIG. 3 is a cross-sectional view of the mold and trim panel of FIG. 2 with the mold closed.

In various exemplary embodiments, as shown in FIG. 3, the mold 110 is closed, compressing the trim panel 101 and giving the trim panel 101 its finished shape. The mold 110 includes a cutting system 120 with a lower insert tool 121 and an upper insert tool 122 that pinches or compresses the trim panel 101 forming the edge of a sunroof opening. The trim panel 101 is pinched or compressed between the upper half and lower half of the mold 110. The trim panel 101 is compressed to its thinnest at a single point on each side of the cross-section of the mold 110. This point forms a continuous edge around what will be the sunroof opening in the trim panel 101. Similar cutting structures can be used to form the outside edge of the headliner.

Figure 4:
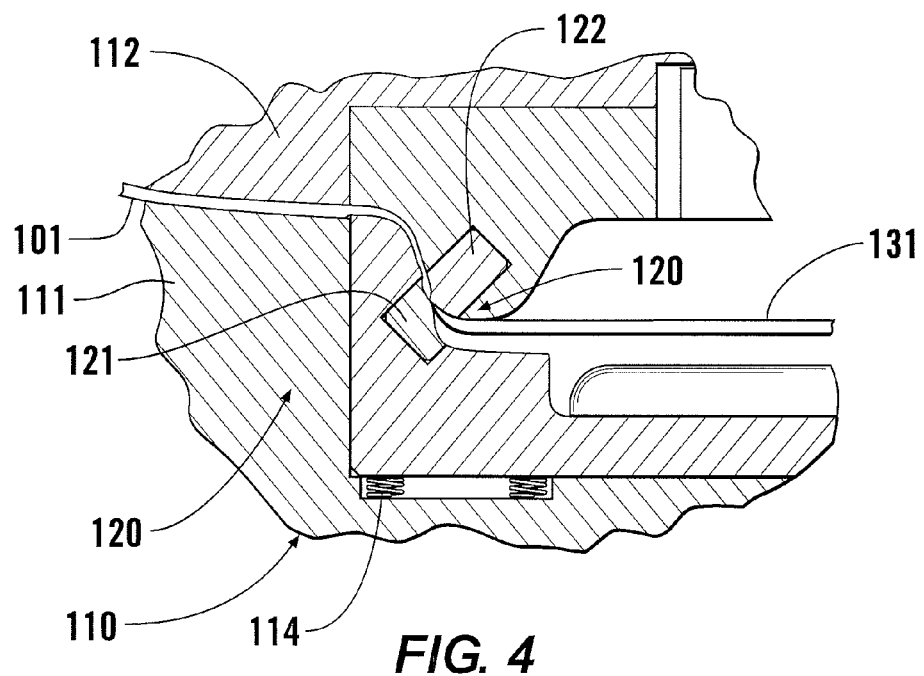
FIG. 4 is a partial cross-sectional view of the mold and trim panel of FIG. 3.

In various exemplary embodiments, as illustrated in FIG. 4, the pinch-seal cutting system 120 comprises a lower insert tool 121 and an upper insert tool 122. The lower insert tool 121 includes a lower cutting surface 123 and the upper insert tool 122 includes an upper cutting surface 124. In various exemplary embodiments, the lower cutting surface 123 includes a lower ridge 125 and the upper cutting surface 124 includes an upper ridge 126. When the mold 110 is closed, the lower ridge 125 and the upper ridge 126 come into contact and compress or pinch the trim panel 101 to the point that the trim panel 101 is cut along a line between the lower ridge 125 and the upper ridge 126. In various exemplary embodiments, the lower cutting surface 123 and/or upper cutting surface 124 may include lower ridge 125 and/or upper ridge 126 with a sharp edge. In some exemplary embodiments the lower ridge 125 and/or upper ridge 126 may have rounded tips (e.g., a tip with a 0.1 radian curve).

In various exemplary embodiments, as illustrated in FIG. 4, one or more movable inserts 114 are used to limit the amount of force that can be applied by the mold 110. It should be appreciated that the one or more movable inserts 114 may be implemented using any known or later-developed devise capable of absorbing force such as, for example, coil springs, Belleville washers, hydraulic springs, compression springs, disk and/or wave type springs, gas and/or nitrogen springs, and/or pneumatic and/or hydraulic pistons. In various exemplary embodiments, the movable inserts 114 may be spring loaded or non-spring loaded.

Figure 5:
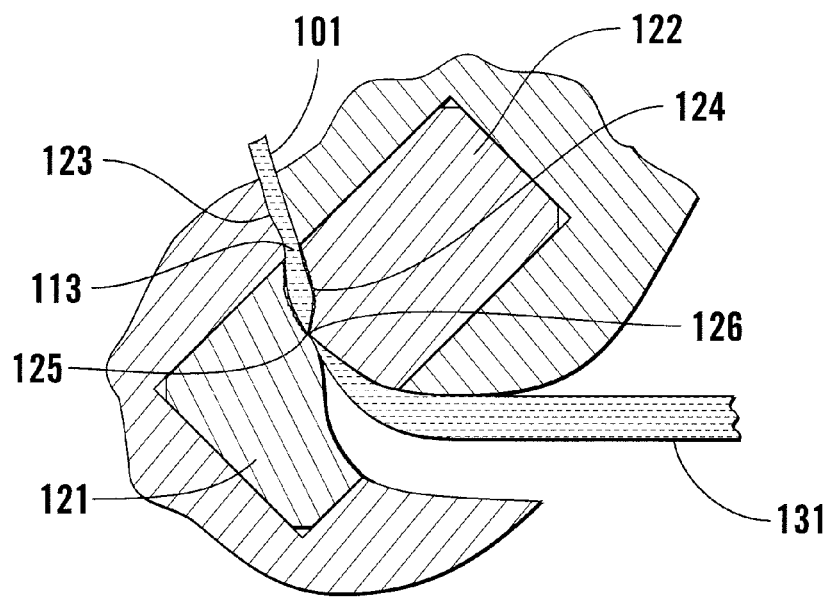
FIG. 5 is a partial cross-sectional view of the mold and trim panel of FIG. 3.

FIG. 5 illustrates how a clean even edge is formed. In various exemplary embodiments, the trim panel 101 is formed with at least a substrate layer and fabric layer. Compressing the trim panel binds the components together, but cutting the trim panel material may cause or allow one of the component layers (e.g., the headliner fabric) to pull back from the point of the cut. To prevent this, as shown in FIG. 5, the area of the trim panel 101 adjacent to the cut is held in place by two structures and/or mechanisms. First, a narrowed section 113 in the mold 110 profile applies extra compression to the trim panel 101. In various exemplary embodiments, this pressure is not sufficiently great to result in a noticeable marking in the finished headliner. In addition, at least a portion of the lower cutting surface 123 and/or the upper cutting surface 124 comprises a grained or textured surface (for example, a portion similar in texture to sandpaper), placing additional friction on the trim panel 101 components to immobilize them. In various exemplary embodiments, the grained surfaces are confined to an area from about the narrowed section 113 to the lower ridge 125 and/or upper ridge 126, with the remainder of lower cutting surface 123 and the upper cutting surface 124 left relatively smooth, to allow easy removal of the offal 131.

Figure 6:
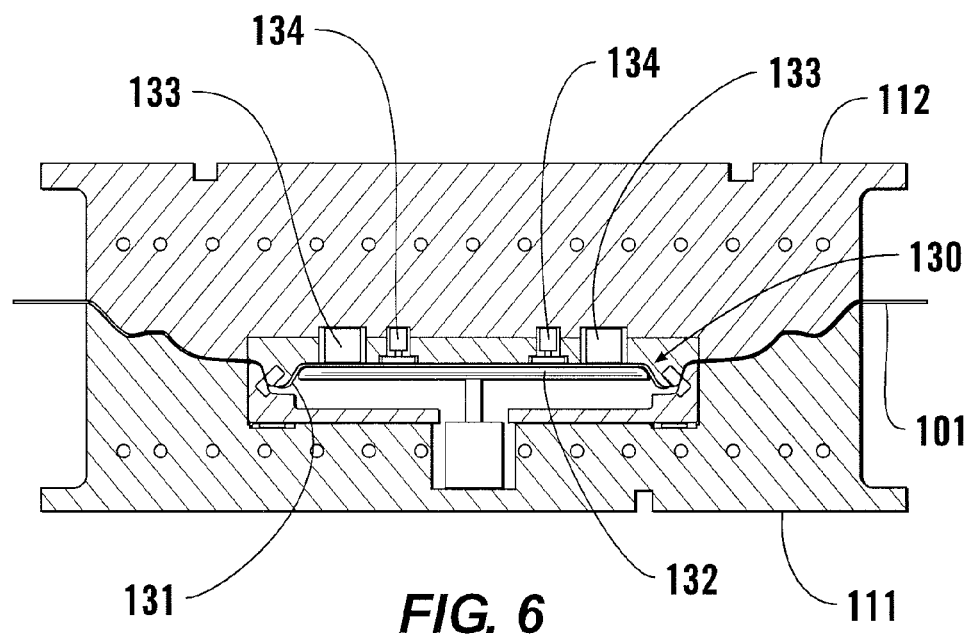
FIG. 6 is a cross-sectional view of the mold and trim panel of FIG. 3 and an exemplary embodiment of a scrap handling system according to this invention.

As illustrated by FIG. 6, cutting a sunroof opening in the trim panel 101 produces a piece of scrap or offal 131 that must be removed from the mold 110 before it can be used again. Having a person reach into the mold 110 to remove the offal 131 is undesirable because of safety concerns. Performing this function with a robot is also undesirable because of the cost of such a system and the risk of damage to the robot and/or the mold 110. Also, sequentially removing the trim panel 101 and the offal 131 is a time-consuming process that slows the overall production of finished trim panels 101.

In various exemplary embodiments, as shown in FIG. 6, an offal handling system 130 separates the cutout offal 131 from the trim panel 101 and controls removal of the offal 131 from the mold 110. A lifter 132 located in the lower piece 111 of the mold 110 pushes the offal 131 against the top of the mold 110. This action pulls the edges of the offal 131 away from the edges of the sunroof opening. One or more grippers 133 located in the upper piece 122 of the mold 110 then attach to the offal 131.

Figure 7:
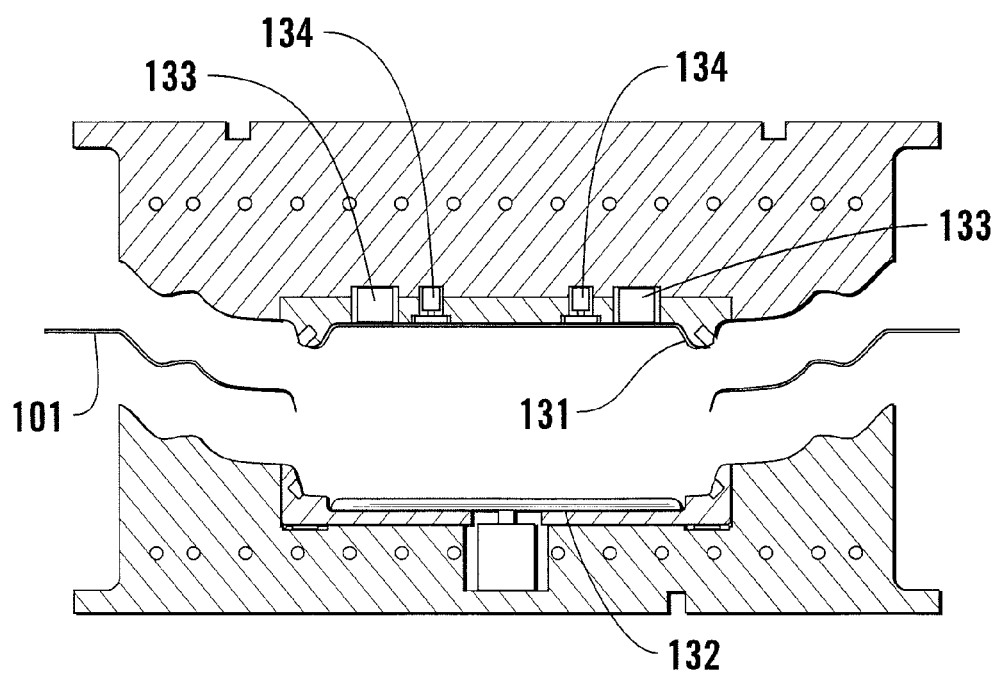
FIG. 7 is a cross-sectional view of the mold, trim panel, and scrap handling system of FIG. 6 with the mold open.

In various exemplary embodiments, as illustrated in FIG. 7, the mold 110 is opened after the trim panel 101 is formed, thus lifting and the offal 131 away from the trim panel 101. As the trim panel 101 exits the mold 110, the grippers 133 release the offal 131, allowing the offal 131 to fall onto the trim panel 101 and exit the mold 110 as the headliner 101 is carried away from the mold 110. In order to insure that the offal 131 falls when released by the grippers 133, one or more release mechanisms 134 apply downward force to the offal 131, physically separating it from the one or more grippers 133. In various exemplary embodiments, the one or more grippers 133 use small needles that extend from and retract into the surface of the gripper 133. However, it should be appreciated that the grippers 133 may be implemented using any device or mechanism capable of holding and lifting the offal 131, such as, for example, a vacuum system, the hook portion of a hook and loop fastening structure. In various exemplary embodiments, each one or more release mechanism 134 includes a piston, but may be any known or later-developed device or mechanism capable of applying force to the offal 131 and/or detaching the offal 131 from the one or more grippers 133, such as, for example, pressurized gas.

Over time, cutting tools tend to become dull and ineffective. In particular, metal on metal rubbing or grating can quickly wear parts down. Excessive contact can be caused by, among other things, bypass cutting or application of excessive force in closing the mold 110. In various exemplary embodiments, the mold 110 is designed to minimize contact and force and maximize resistance to wear.

In various exemplary embodiments, the lower insert tools 121 and/or the upper insert tools 122 comprise hard materials. For example, lower insert tools 121 and the upper insert tools 122 may comprise hardened metals, such as sintered powdered metals (e.g., CPM 10V, CPM 15V) and/or heat-treated metals (e.g., S7, d2, p20, 4140), including flame-hardened and thru-hardened metals. In various exemplary embodiments, the hardness of at least the upper and/or lower cutting surfaces 124 and/or 123 is greater than about HRC 30. In other exemplary embodiments, the hardness of at least the upper and/or lower cutting surfaces 124 and/or 123 is at least about HRC 45. In still other exemplary embodiments, the hardness of at least the upper and/or lower cutting surfaces 124 and/or 123 is at least about HRC 60.

Figure 8:
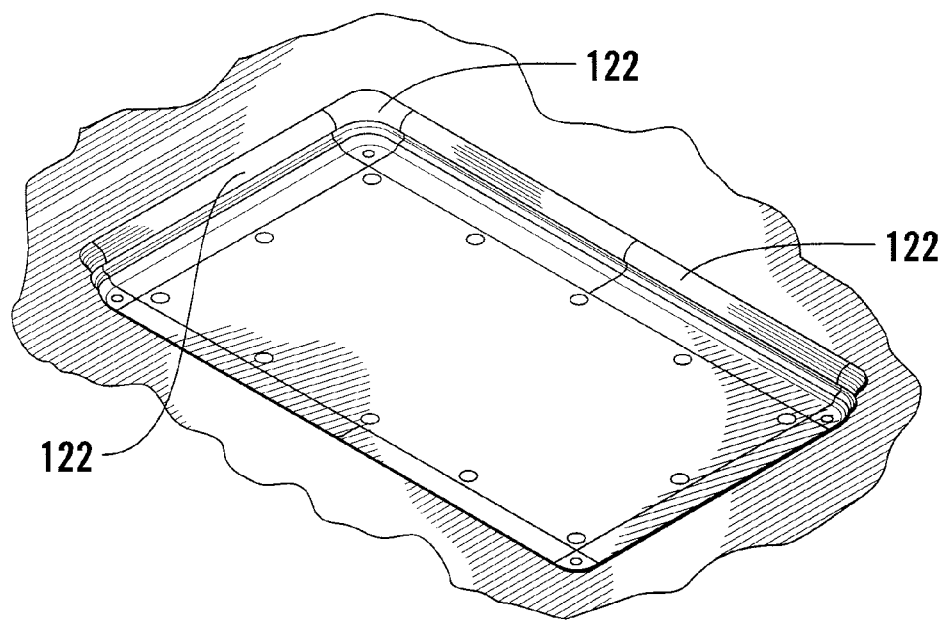
FIG. 8 is a perspective view of an exemplary embodiment of a portion of the top half of a mold according to this invention.
Figure 9:
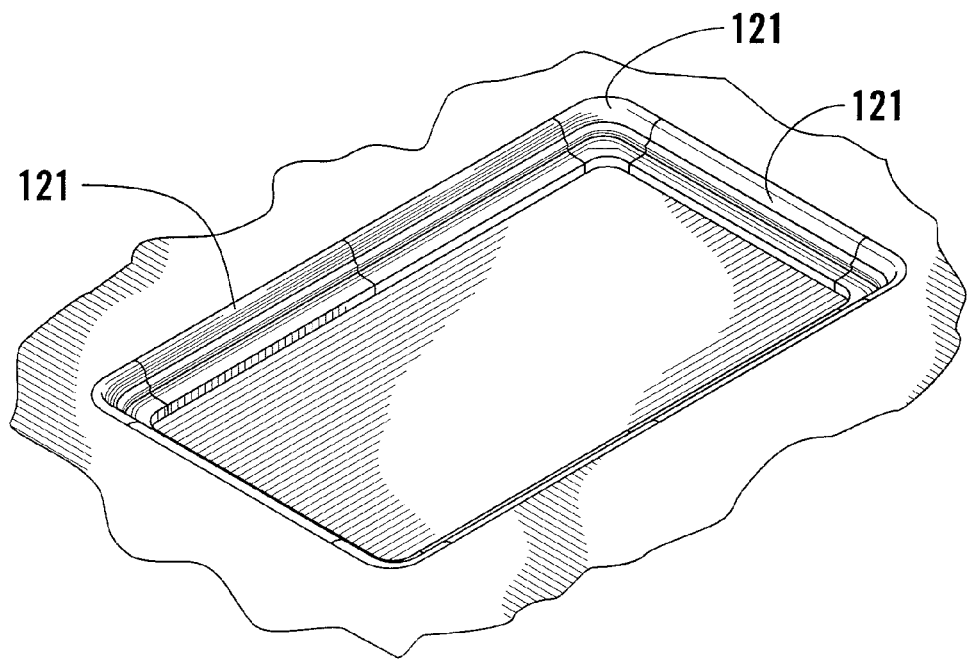
FIG. 9 is a perspective view of an exemplary embodiment of a portion of the bottom half of a mold according to this invention.

In various exemplary embodiments, as illustrated in FIGS. 8 and 9, the mold 110 includes a plurality of lower insert tools 121 and/or a plurality the upper insert tools 122 to form the entire cutting edge. As needed, one or more of the lower insert tools 121 and/or the upper insert tools 122 may be removed from the mold 110 for repair, resurfacing, and/or replacement. Following any resurfacing or other repair to at least the lower cutting surface 123 and/or the upper cutting surface 124, the lower insert tools 121 and/or the upper insert tools 122 are reinserted into the mold 110 and shimmed in or otherwise securely positioned in the mold 110 in order to maintain them in their proper position relative to the mold 110 and to each other.

Figure 10:
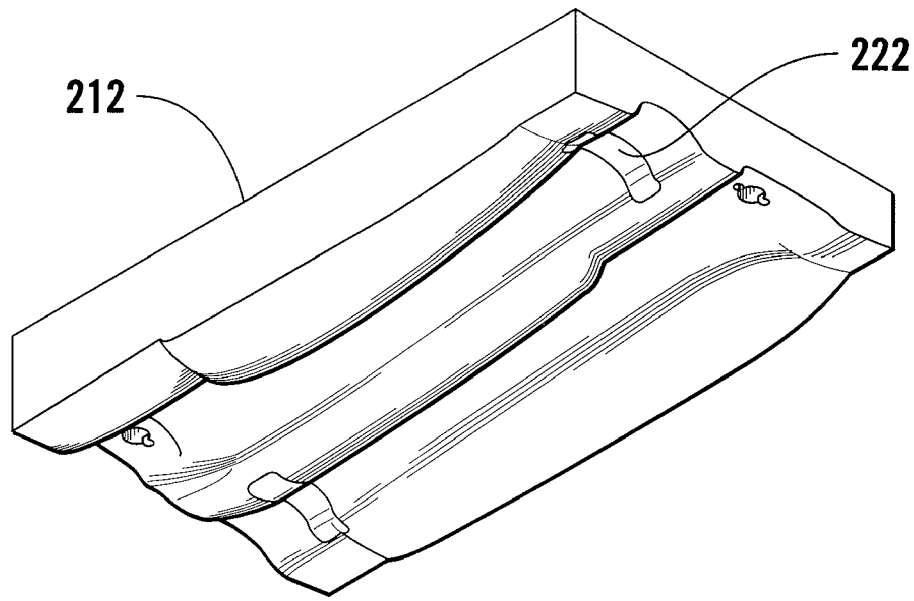
FIG. 10 is a perspective view of an exemplary embodiment of an upper half of a garnish mold according to this invention.
Figure 11:
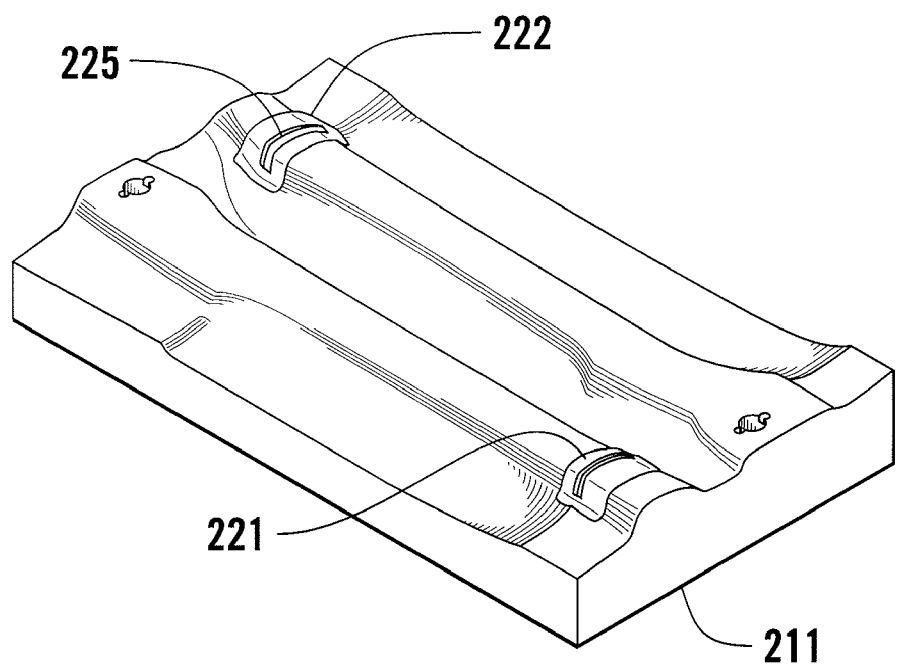
FIG. 11 is a perspective view of an exemplary embodiment of a bottom half of a garnish mold according to this invention.

FIGS. 10 and 11 illustrate the upper mold piece 212 and lower mold piece 211, respectively, of an exemplary embodiment of a mold 210 for forming garnishes with a pinch-sealed edge. The upper piece 212 includes one or more upper insert tools 222. The lower piece 211 includes one or more lower insert tools 221 with a ridge 225. In various exemplary embodiments, the ridge 225 may be included on the lower insert tool(s) 221, the upper insert tool(s) 222, or both. The garnish material is inserted into the mold 210 and the mold 210 is closed. In various exemplary embodiments, the garnish material may be heated before entering the mold 210 or be heated in the mold 210, if heating the garnish material is desired. In various exemplary embodiments, the upper mold piece 212 and lower mold piece 211 as shown may be interchanged as to which is above and below the other.

Figure 12:
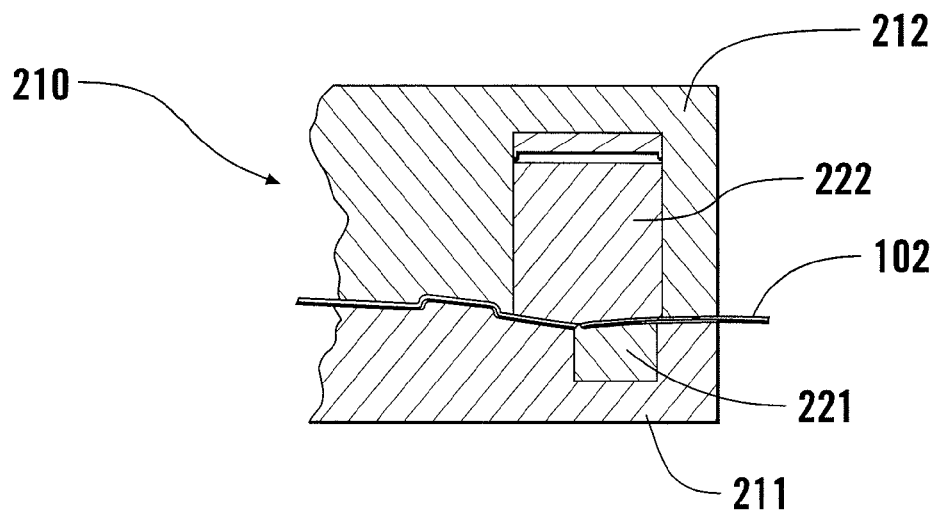
FIG. 12 is a partial cross-sectional side view of an exemplary embodiment of a closed mold for a garnish and a garnish according to this invention.
Figure 13:
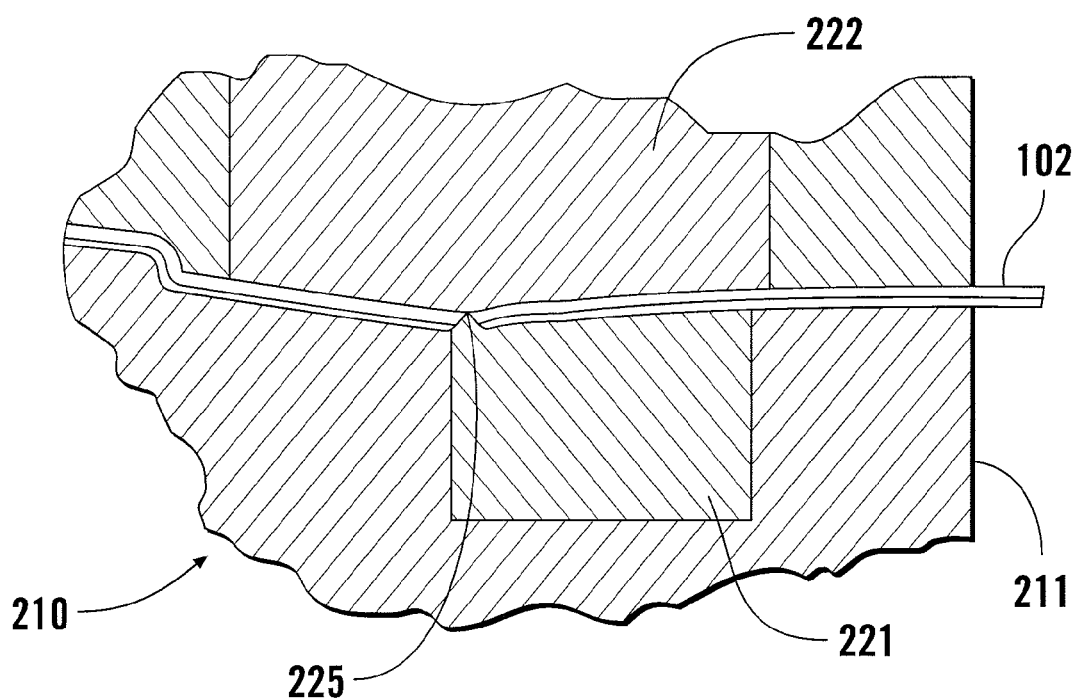
FIG. 13 is a partial cross-sectional side view of the mold and garnish of FIG. 11.

In various exemplary embodiments, as shown in FIGS. 12 and 13, a garnish is shaped in a compression mold. The ridge 225 contacts the upper insert tool 222 to compress or pinch and cut the garnish material. In various exemplary embodiments, other garnish edges that are not pinch-seal cut may be cut in a secondary operation by any appropriate method. As illustrated in FIG. 4 for a headliner mold, movable inserts are used to limit the amount of force that can be applied on other molds and trim panels. The movable inserts may be implemented using any known or later-developed device or structure capable of absorbing force such as, for example, coil springs, Belleville washers, hydraulic springs, compression springs, disk and/or wave type springs, gas and/or nitrogen springs, and/or pneumatic and/or hydraulic pistons.

In various exemplary embodiments, the lower insert tools 221 and the upper insert tools 222 comprise hard materials. For example, the lower insert tools 221 and the upper insert tools 222 may comprise hardened metals such as sintered powdered metals (e.g., CPM 10V, CPM 15V,) and/or heat-treated metals (e.g., S7, d2, p20, 4140), including flame-hardened and thru-hardened metals. In various exemplary embodiments, the lower insert tool 221 and/or the upper insert tool 222 may be removed for repair, resurfacing, or replacement.

Figure 14:
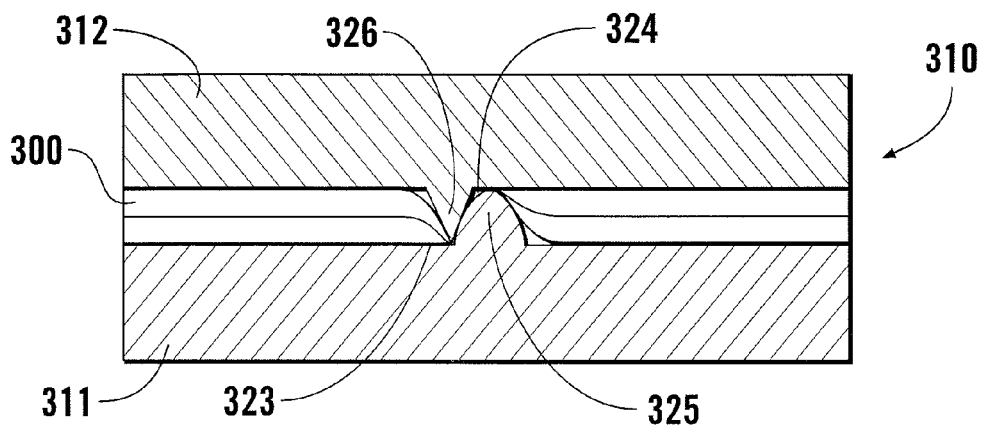
FIG. 14 is a cross section of a portion of a mold for a trim panel according to one embodiment.
Figure 15:
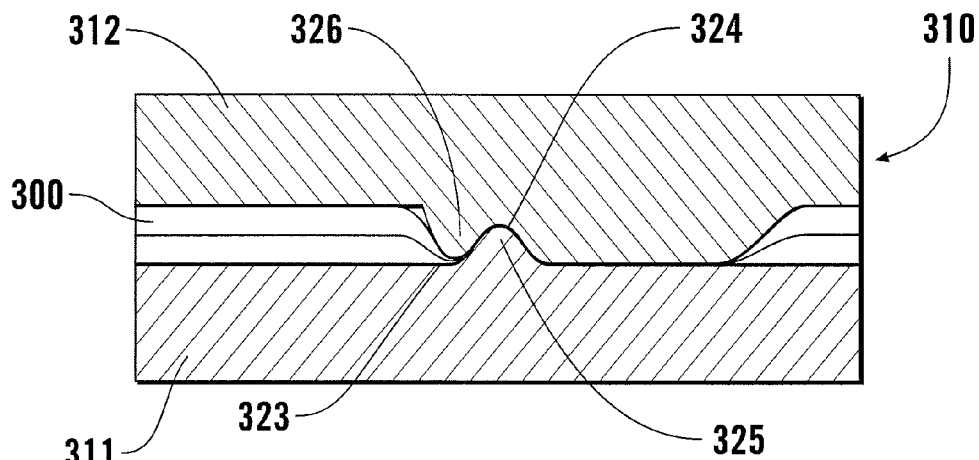
FIG. 15 is a cross section of a portion of an exemplary embodiment of a mold for a trim panel according to this invention.

FIGS. 14 and 15 show two exemplary embodiments of a portion of a mold 310 for forming a trim panel 300. The mold 310 includes a lower half 311 and an upper half 312. The lower half 311 and the upper half 312 are closed together around the trim panel 300 and heat compress and shape the trim panel stock between them. The lower half 311 of the mold 310 preferably includes a lower land area or surface 323 and a lower ridge or protrusion 325. The upper half 312 of the mold 310 preferably includes an upper land area or surface 324 and an upper ridge or protrusion 326. When the mold 310 is closed, the upper ridge 326 compresses the trim panel stock against the lower land area 323 approximate to the upper ridge 326. The trim panel stock is further compressed between the lower ridge 325 and the upper ridge 326 and is severed. The embodiment in FIG. 5 includes a upper ridge 326 that extends outward from both sides of the lower ridge 325.

Figure 16:
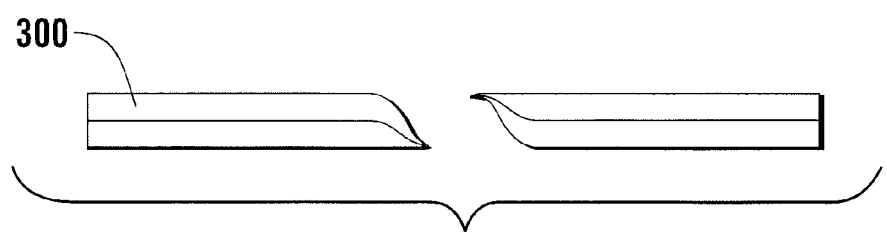
FIG. 16 is a cross section of an exemplary embodiment of a trim panel and offal formed by the mold of FIG. 14.

As shown in FIG. 16, the trim panel 300 is removed from the mold 310 and separated from the scrap or offal to form the finished trim panel 300. According to one exemplary embodiment, the mold 310 forms a trim panel 300 with a rounded over "bull-nose" edge on the outer edge and/or inner edge of an opening. By utilizing specific geometry in the mold 310, the trim panel 300 is formed with a sealed edge that is cut inside the mold 310. The trim panel 300 edges are cut with the single action of the mold 310 and do not require additional cutting actions in the mold 310 (e.g., cylinders, cams, etc.).

Figure 17:
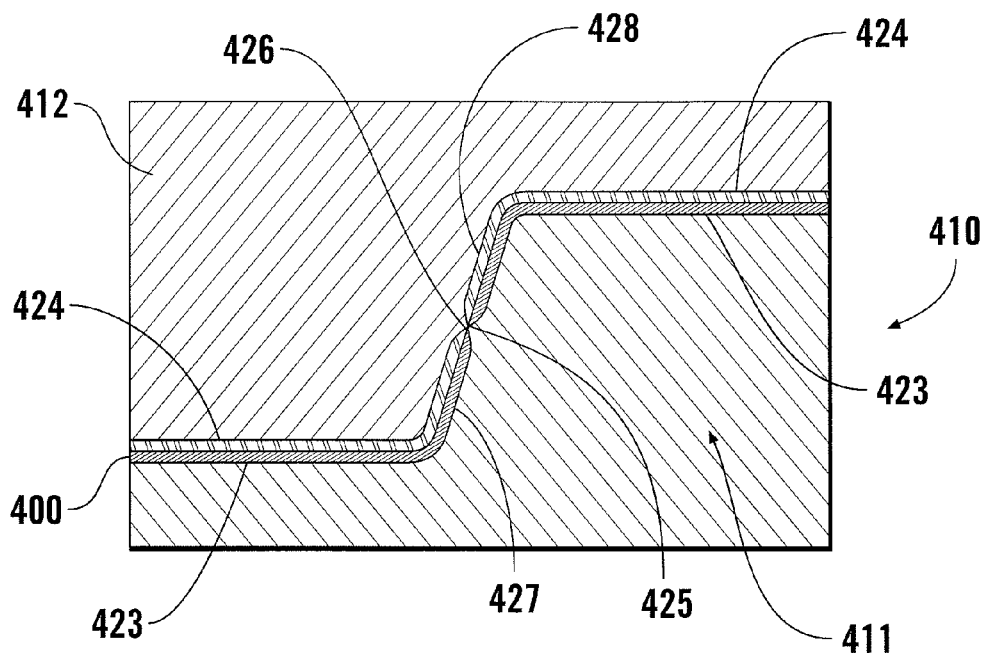
FIG. 17 is a cross section of an exemplary embodiment of a portion of a mold for a trim panel according to this invention.
Figure 18:
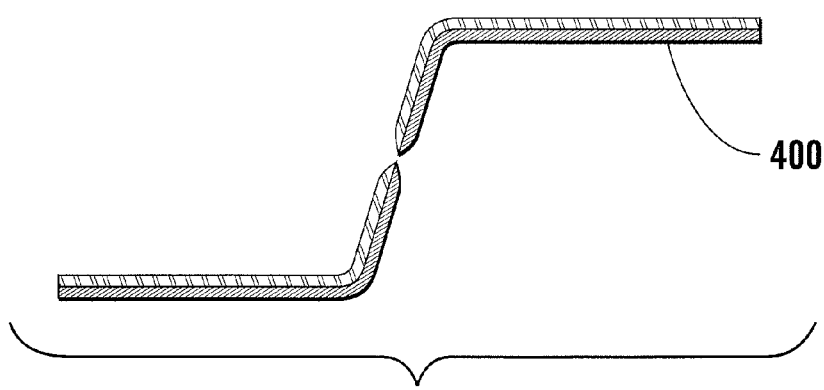
FIG. 18 is a cross section of a trim panel and offal formed by the mold of FIG. 17 according to this invention.

FIG. 17 shows one exemplary embodiment of a portion of a mold 410 usable to form a trim panel 400. The mold 410 preferably includes a lower half 411 and an upper half 412. The lower half 411 and the upper half 412 are closed together around the trim panel 400 and heat compress and shape the trim panel stock between them. The lower half 411 of the mold 410 includes first and second lower portions or surfaces 423 and a lower inclined land area or surface 427 that extends between the first and second portions 427 at an angle relative to the lower portions 423. A lower ridge or protrusion 425 extends from the lower inclined land area 427. As shown in FIG. 17, the lower ridge 425 has a generally triangular cross-section in this embodiment. The upper half 412 of the mold 410 is formed similarly, with first and second upper portions or surfaces 424, an upper inclined land area portions 424 or surface 428 that extends between the first and second portions 427 at an angle relative to the lower portions 423, and an upper ridge or protrusion 426. When the mold 410 is closed, the lower ridge 425 compresses the trim panel stock against the second ridge 426. As the mold 410 is closed, the tips of the lower ridge 425 and the upper ridge 426 are brought in close proximity to each other, severing the trim panel 400. FIG. 18 shows the trim panel 400 after being formed and cut in the mold 410 of FIG. 17. The mold 410 is configured to separate the trim panel 400 from the scrap or offal. The lower inclined land area 427 and upper inclined land area 428 form a lip or rim around the edge of the trim panel 400. Such configuration of the mold 410 may be used to form a finished edge for the trim panel 400, especially around a sunroof opening.

In various exemplary embodiments, the disclosed methods and/or apparatus may be adapted to cut edges that are straight or curved. In various exemplary embodiments, a cutout formed by the disclosed method and/or apparatus may be of any shape or form including round and slotted openings. In various exemplary embodiments, a pinch-sealed edge may be formed on one or more various edges of a trim panel. For example, a trim panel such as a sun visor may be formed with a pinch sealed outer edge and/or with a pinch-sealed edge around an inner edge such as for installation of a vanity mirror. In various exemplary embodiments, more than one opening with pinch-sealed edges may be formed in a singe trim panel.

In various exemplary embodiments, the headliner may be formed from any combination of substrates and coverstocks capable of being compression formed. For example, the coverstock may be knit, woven, non-woven, felt, carpet, fleece, vinyl, PVC, among others. Also by way of example, the substrate may be polypropylene, glass, polyurethane wet and dry, wood or other natural fibers, among others.

In various exemplary embodiments, the pinch-sealed edge may be formed on less than all edges of the finished trim panel. For example, a garnish may have only one edge that is generally visible after installation. This edge may be pinch-sealed, as described above, while other edges may be formed or cut by other methods (e.g., waterjet cutting or die trimming). Thus, it is not necessary for a trim panel to be formed with a pinch-sealed finish on all edges to be within the scope of this invention as claimed.

After they are finished, the trim panels are stacked for shipment to a vehicle manufacturing plant. Trim panels using conventional folded edges have roughly double the thickness at the edge compared to the pinch-sealed edges of trim panels manufactured according to the disclosed methods. Because of this difference, it is possible to increase the pack density of trim panels reducing the space required compared to conventional folded edge trim panels. This significantly reduces transportation costs associated with supplying the trim panels to a vehicle manufacturing plant.

It should be noted that references to relative positions (e.g., "top" and "bottom", or "upper" and "lower") in this description are merely used to identify various elements as are oriented in the figures. It should be recognized that the orientation of particular components may vary greatly depending on the application in which they are used.

The construction and arrangement of the elements of the trim panels, as shown in the various exemplary embodiments, is illustrative only. Although only a few embodiments have been described in detail in this disclosure, it should be appreciated that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials in any of a wide variety of colors, textures and combinations, other substitutions, modifications, changes and omissions may be made in the design, operating conditions, and arrangement of the exemplary embodiments.

What is claimed is:

1. A method of manufacturing a trim panel, comprising:
   placing a sheet of material in a mold; compressing the sheet of material in the mold to form the sheet of material into the trim panel; and
   forming at least one pinch-sealed edge on the trim panel by compressing a portion of the sheet of material in the mold until the sheet of material is severed to form an edge;
   wherein the trim panel is a garnish, a door panel, or a headliner.

2. The method of claim 1 wherein the mold comprises two cutting surfaces with a hardness greater than HRC 30.

3. The method of claims 1 wherein the mold comprises two cutting surfaces with a hardness of at least HRC 45.

4. The method of claim 1 wherein the mold comprises two cutting surfaces with a hardness greater than HRC 60.

5. A mold comprising:
   a lower half;
   an upper half;
   a bottom tool insert; and
   a top tool insert;
   wherein,
   the bottom tool insert comprises the first ridge; the top tool insert comprises the second ridge; and the first ridge and the second ridge come into contact with each other when the mold is closed.

6. The mold of claim 5 wherein a first tip on the first ridge and a second tip on the second ridge come into contact with each other when the mold is closed.

7. The mold of claims 5 wherein the first tip and the second tip comprise a sintered powdered metal or a heat-treated metal.

8. The mold of claim 5 wherein the bottom tool insert and top tool insert have hardnesses greater than HRC 30.

9. The mold of claim 5 wherein the bottom tool insert and top tool insert have hardnesses of at least NRC 45.

10. The mold of claim 5 wherein the mold comprises two cutting surfaces with a hardness greater than HRC 60.

11. A mold for forming a trim panel, comprising:
a lower mold piece;
an upper mold piece;
a lower tool insert in the lower mold piece;
an upper tool insert in the upper mold piece: and at least one ridge.

12. The mold of claim 11 wherein the ridge is on one or both of the lower insert tool or the upper insert tool.

13. The mold of claims 11 wherein the first tip and the second tip comprise a sintered powdered metal or a heat-treated metal.

14. The mold of claim 11 wherein the ridge has a hardness greater than HRC 30.

15. The mold of claims 11 wherein the ridge has a hardness of at least HRC 45.

* * * * *